United States Patent [19]

Nederlof et al.

[11] 4,174,616

[45] Nov. 20, 1979

[54] INSULATED CYLINDER SLEEVE FOR A HOT-GAS ENGINE

[75] Inventors: Anton M. Nederlof; George A. A. Asselman, both of Eindhoven, Netherlands

[73] Assignee: U.S. Philips Corporation, New York, N.Y.

[21] Appl. No.: 820,460

[22] Filed: Aug. 1, 1977

[30] Foreign Application Priority Data

Aug. 5, 1976 [NL] Netherlands ........................ 7608689

[51] Int. Cl.$^{2}$ ........................ F16J 11/04; F02G 1/04

[52] U.S. Cl. ........................ 60/517; 92/144; 92/171

[58] Field of Search .................... 60/517; 92/144, 171; 123/193 C

[56] References Cited

U.S. PATENT DOCUMENTS

| | | | |
|---|---|---|---|
| 1,277,849 | 9/1918 | Campbell et al. | 60/517 |
| 1,758,474 | 5/1930 | Seehaus | 165/DIG. 4 |
| 2,073,385 | 3/1937 | Blocker | 92/144 |
| 3,490,234 | 1/1970 | Lea | 92/144 |

FOREIGN PATENT DOCUMENTS

| | | |
|---|---|---|
| 1965849 | 7/1971 | Fed. Rep. of Germany . |
| 1267859 | 6/1960 | France . |

*Primary Examiner*—Allen M. Ostrager

*Attorney, Agent, or Firm*—David R. Treacy

[57] ABSTRACT

A hot-gas engine having a heat insulating lining of loose grains surrounding the hot working medium spaces of the cylinder and the regenerator housing.

6 Claims, 1 Drawing Figure

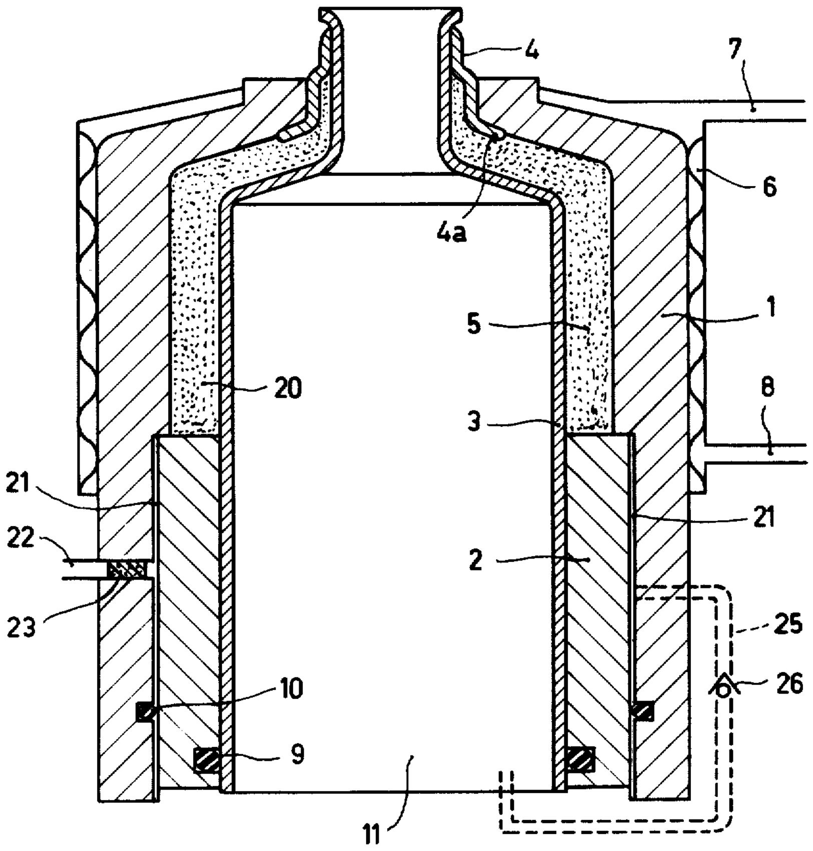
4
7
6
4a
5
1
20
8
3
21
21
22
2
23
25
26
10
9
11

INSULATED CYLINDER SLEEVE FOR A HOT-GAS ENGINE

The invention relates to a hot-gas engine, comprising at least one metal housing, such as a cylinder or a regenerator housing, which envelops a chamber in which a pressurized working medium is present during operation and which is provided on at least part of its inner side with a layer of a heat insulating material.

A hot-gas engine of the described kind is known from U.S. Pat. No. 3,861,146.

In the known hot-gas engine, at least the part of the cylinder which bounds the hot expansion space and at least the part of the regenerator housing in which the hot regenerator part is accommodated are provided on the inner side with a layer of heat insulating material, notably a (glass) ceramic material, the relevant parts of the cylinder and the regenerator housing being cooled by forced cooling. The cylinder and the regenerator housing may thus be made of cheap materials.

The present invention has for its object to provide an improved hot-gas engine of the described kind which has an even cheaper and simpler construction.

In accordance with the invention the heat insulating layer consists of grains, such as grains of sand or grains of $ZrO_2$, contained in an annular space which is formed at least substantially by the inner wall of the housing and a metal sleeve.

Grains of sand and grains of zirconium oxide are cheap and require no further (heat) treatments, and the metal sleeve can be simply and inexpensively manufactured.

The inner wall of the (normally cast) housing does not require a surface treatment (milling) at the area where it contacts the grains. Therefore, large dimensional deviations of the cast are acceptable.

Assembly of the unit can be performed in a short period of time (no heat treatments).

A preferred embodiment of the hot-gas engine in accordance with the invention is characterized in that the annular space communicates with a space in which a pressure prevails which is lower than the working medium pressure in the chamber.

Because the gas pressure in the layer of grains is always lower than the working medium pressure, the metal sleeve is always positively kept pressed against the grains. A control device for regulating the gas pressure in the layer in view of the varying mean working medium pressure in the chamber during power control of the engine is thus superfluous.

Preferably, the annular space communicates with the ambient atmosphere via a filter. This filter allows passage of air, but does not allow passage of grains.

A further preferred embodiment of the hot-gas engine in accordance with the invention is characterized in that the annular space communicates with the chamber via a non-return valve which opens in the direction of the chamber.

This is advantageous if working medium, for example, hydrogen, duffuses through the metal sleeve and may not be lost.

The non-return valve opens if the working medium pressure in the layer of grains exceeds the (periodically varying) working medium pressure in the chamber. Working medium is then instantaneously returned from the layer of grains to the chamber.

The invention will be described in detail hereinafter with reference to the accompanying diagrammatic drawing which is not to scale.

The FIGURE shows a longitudinal sectional view of an embodiment of a cylinder housing, the inner side of which is provided with a heat insulating layer of sand.

The reference numeral 1 in the FIGURE denotes a housing which serves as a cylinder of a hot-gas engine and which comprises a lining 2, a thin metal sleeve 3 and a metal cap 4 with a collar 4*a*, within which a layer of sand 5 is contained.

Around the cylinder 1 there is provided a cooling coil 6 wherethrough a cooling medium can flow and which comprises a medium inlet 7 and a medium outlet 8.

At the lower side of the lining 2 there is provided a seal 9 between the lining and the sleeve 3, and a seal 10 is provided between the lining 2 and the cylinder 1.

The chamber 11 constitutes the hot expansion space of the hot-gas engine during operation, a displacer (not shown) being reciprocatable inside the chamber.

The heater pipes may be connected to the upper side of the chamber 11 by way of a manifold.

In order to achieve a suitable sand seal with the cap 4, the construction is preferably so that the collar 4*a* is biased against the cylinder wall.

The cap 4 can be locked, if desired, by means of a ring.

The annular space 20, filled with sand 5, communicates, via a gap 21 between the lining 2 and the cylinder 1, with a duct 22 which opens into the ambient atmosphere.

As a result, atmospheric pressure, being lower than the working medium pressure in the chamber 11, always prevails in the space 20, so that the walls of the metal sleeve 3 may be thin.

The duct 22 includes a filter 23.

If the working medium used is, for example, hydrogen which tends to diffuse through the wall of the sleeve 3, and it is desired that the escaping hydrogen not be lost, the gap 21 may be connected, via a duct 25 which includes a non-return valve 26, to the chamber 11. The duct 22 is then, of course, omitted or closed. The non-return valve 26 opens in the direction of the chamber 11. When the hydrogen pressure in the space 20 or the gap 21 exceeds the instantaneous cycle pressure in the chamber 11, the valve 26 opens and hydrogen flows back to the chamber 11.

What is claimed is:

1. A hot-gas engine, comprising at least one metal housing which envelops a chamber in which a pressurized working medium is present during operation, and a layer of a heat insulating material on at least part of the inner side of the housing, characterized in that the engine includes a metal sleeve bounding a portion of the chamber and defining an inner wall of an annular spaced formed at least substantially by the inner wall of the housing and the metal sleeve, the insulating layer consisting of granular material filling the annular space such that the metal sleeve presses against and is supported by the grains of insulating material, whereby the insulating material provides structural support for the sleeve against the effects of internal pressure in the chamber.

2. A hot-gas engine as claimed in claim 1, characterized in that the annular space communicates with a space in which a pressure prevails which is lower than the working medium pressure in the chamber.

3. A hot-gas engine as claimed in claim 2, characterized in that the annular space communicates with the ambient atmosphere via a filter.

4. A hot-gas engine as claimed in claim 1, characterized in that the annular space communicates with the chamber via a non-return valve which opens in the direction of the chamber.

5. A hot-gas engine as claimed in claim 1, wherein the granular material is sand.

6. A hot-gas engine as claimed in claim 1, wherein the granular material is zirconium oxide.

* * * * *